UNITED STATES PATENT OFFICE.

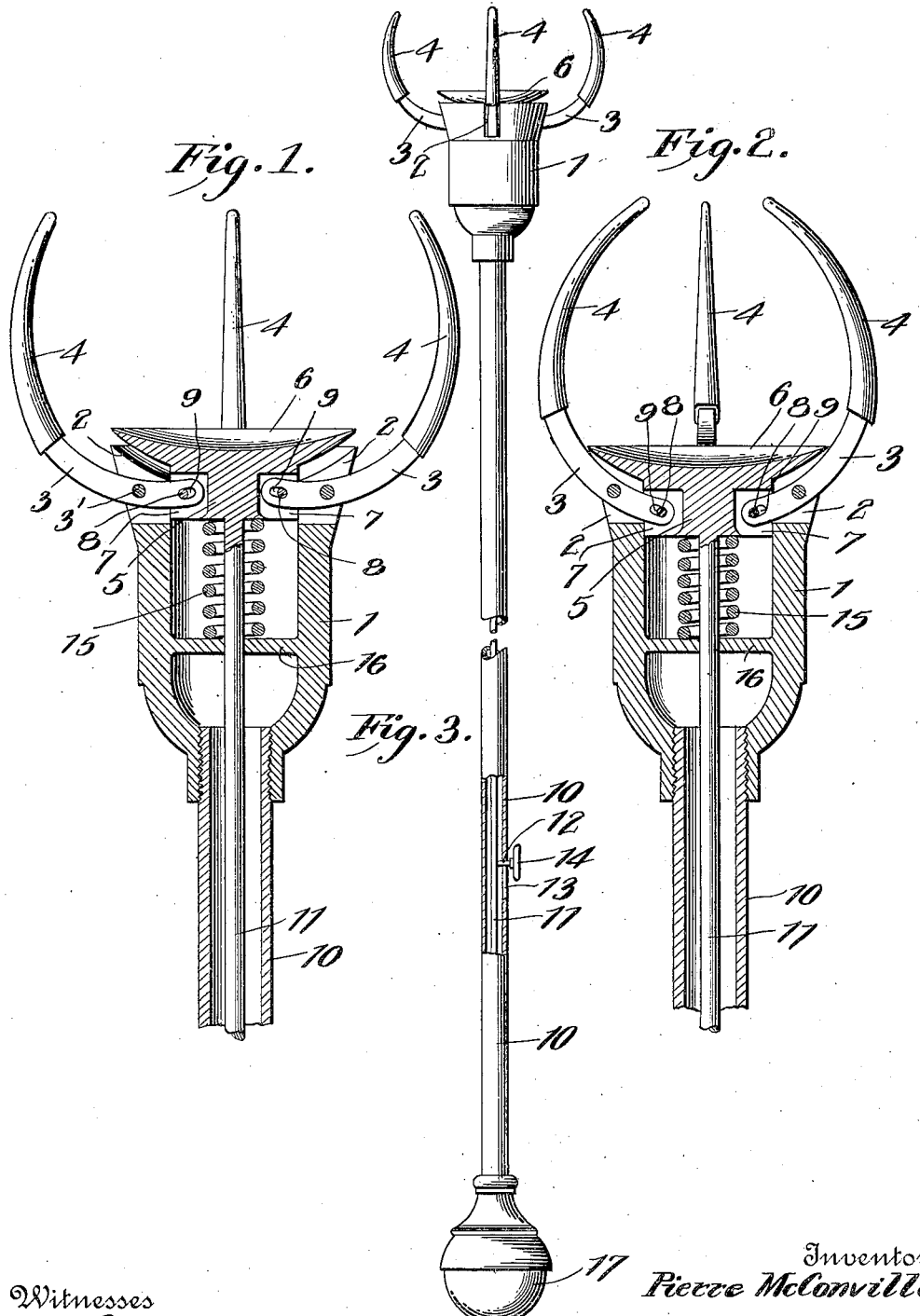

PIERRE McCONVILLE, OF CŒUR D'ALENE, IDAHO.

FRUIT-PICKER.

No. 925,212.   Specification of Letters Patent.   Patented June 15, 1909.

Application filed November 27, 1908. Serial No. 464,711.

*To all whom it may concern:*

Be it known that I, PIERRE MCCONVILLE, a citizen of the United States, residing at Cœur d'Alene, in the county of Kootenai and State of Idaho, have invented certain new and useful Improvements in Fruit-Pickers; and I do declare the following to be a full, clear, and exact description of the invention, such as will enable others skilled in the art to which it appertains to make and use the same.

This invention relates to an improved fruit picker and the object of the invention is to provide a simply constructed and efficient device of this character which will pick the fruit from the top of trees and other points without danger of damaging it.

With this and other objects in view, the invention consists of certain novel features of construction, combination and arrangement of parts, as will be more fully described and particularly pointed out in the appended claims.

In the accompanying drawings:—Figure 1 represents a longitudinal vertical section of this improved picker with the clamping fingers in open normal position, and with the handle broken off; Fig. 2 represents a similar view with the fingers in closed position, and Fig. 3 represents a side elevation of this improved picker with the fingers in open position and with parts broken out.

In the embodiment illustrated, a hollow head, 1, is shown provided in its upper end with radially extending slots as 2, in which are mounted spring fingers, as 3, which are pivoted at 3' to said head and are preferably covered at their outer ends with rubber tubing, 4, or other suitable material to prevent injury to the fruit when grasped thereby. These fingers are curved as shown in the drawings and the lower ends thereof are pivotally connected to a shank, 5, which has a concave disk at its outer end to receive the fruit to be gathered and which is normally held spaced from said head. This shank, 5, is preferably provided with slots, as 7 in which the lower ends of the fingers, 3, extend and are pivoted by pins, as 8, which pass through elongated slots, as 9, in said fingers.

A tubular handle, 10, is detachably connected at one end to the head, 1, and has a finger operating rod, 11, mounted to move longitudinally therein, its upper or inner end being connected with the inner end of the shank, 5, being preferably made integral therewith. This rod, 11, is provided with a laterally extending arm, 12, which projects through a slot, 13, in the tube, 10, and is provided at its outer end with a knob or button, 14, the slot through which said arm 12 projects being designed to limit the movement of the rod, 11, in both directions. The knob 17 may also be used to operate the rod 11 to close the fingers when desired.

A spring, 15, is mounted on the rod, 11, between the lower face of the shank, 5, and a member, 16, within the hollow head and is designed to force the shank, 5, with the fingers, 3, normally outward in open position.

In the use of this invention, the fingers, 3, are held normally in open position by the push spring, 15, and when the fruit to be picked has been selected, these fingers are placed thereover and one of the knobs, 14 or 17, is grasped and moved outward, whereby the shank, 5, and disk, 6, are moved inward against the tension of the spring, 15, and close the fingers with the fruit securely clamped therebetween. On the release of the knob, the fingers fly outwardly under the tension of the spring and the fruit is released and may be dropped into any desired receptacle, the outward movement being limited by contact of the arm, 12. The various parts of this device may be made of any suitable material, the gripping fingers and the rod, 11, being preferably made of steel and the tubular handle may be made any desired length.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

I claim as my invention:—

1. In a fruit picker, the combination of a hollow head provided with a plurality of radially extending slots, a disk for closing the outer end of said head and to receive the fruit, a shank extending from said disk into said head, curved fingers extending through said slots and pivotally connected to said shank and to the walls of said slots below said disk whereby the disk is arranged between said fingers to limit their inward or closing movement, an operating rod connected with said shank, a spring mounted to hold said fingers normally open and means connected with said rod to move it against the tension of said spring to close the fingers.

2. In a fruit picker, the combination of a hollow head having a transverse apertured partition therein, a tubular handle connected with one end of said head, a rod extending longitudinally through said handle and head, a shank carried by the free end of said rod, a disk on the free end of said shank, said head and shank having radial slots, curved fingers extending through the slots in said head and having longitudinal slots in their inner ends, said slotted ends being pivotally mounted and housed in the slots of said shank to prevent them from coming in contact with the fruit being gathered, said fingers being also pivotally mounted in the slots of said head and having the disk arranged between them, a coiled push spring arranged in said head on said rod between said shank and said partition to hold the disk normally in outward position and said fingers open, and means for operating said rod to retract said spring to close the fingers.

3. In a fruit picker, the combination of a hollow head, a hollow handle detachably connected with said head and arranged in longitudinal alinement therewith, an operating rod movable longitudinally in said handle and having an integral shank at one end provided with a laterally extending head arranged to seat on the outer end of said hollow head, said heads being normally in separated position, a spring arranged on said rod to hold its head in normally projected position out of engagement with the seat on the hollow head, a plurality of curved gripping fingers pivotally connected at their inner ends to said rod carried shank and to the side walls of said hollow head, said rod carried head being arranged within said fingers and adapted to limit their inward movement.

In testimony whereof I have hereunto set my hand in presence of two subscribing witnesses.

PIERRE McCONVILLE.

Witnesses:
V. W. PLATT,
H. P. GLINDEMAN.